Jan. 15, 1946.    M. E. PELAEZ    2,392,874
EMERGENCY ESCAPE PANEL
Filed May 12, 1944    2 Sheets-Sheet 1

Inventor
Manuel E. Pelaez

Jan. 15, 1946.  M. E. PELAEZ  2,392,874
EMERGENCY ESCAPE PANEL
Filed May 12, 1944   2 Sheets-Sheet 2
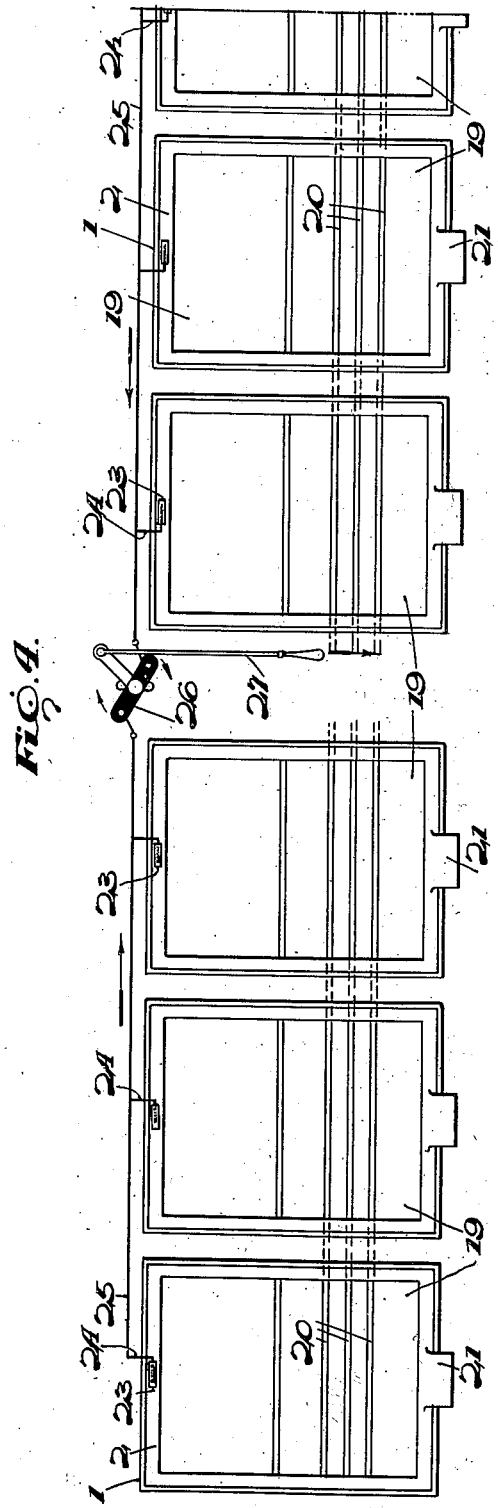
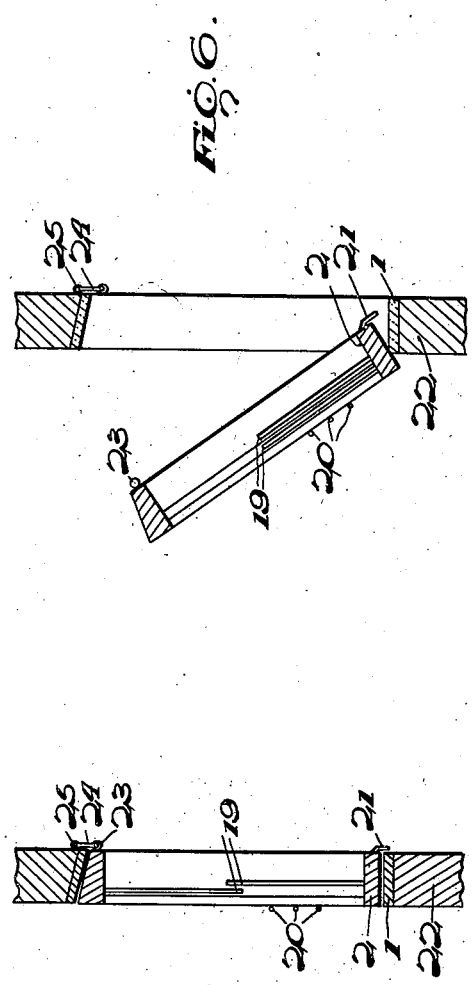
Inventor
Manuel E. Pelaez Patented Jan. 15, 1946

2,392,874

UNITED STATES PATENT OFFICE 2,392,874

EMERGENCY ESCAPE PANEL

Manuel Eduardo Pelaez, Burzaco, Argentina

Application May 12, 1944, Serial No. 535,364
In Argentina May 24, 1943

3 Claims. (Cl. 292—36)

This invention relates to improved means for demountably supporting an emergency escape panel unit in the frame of openings in general, and in particular of the openings of passenger vehicles, and an essential object of the invention consists in providing a combination of elements for readily and speedily performing the separation or withdrawal of a panel from its frame, leaving the opening confined by the same entirely free from obstruction.

The arrangement of the connecting device in accordance with this invention is particularly adapted for use in collective motor cars, omnibuses and similar vehicles for the conveyance of passengers, for providing a means of eventual escape and thus avoid the unfortunate consequences to which the occupants of such vehicles may be exposed in case of overturning, collision, fire and other accidents of transit.

In the present case, the connecting means or device which forms the object of this invention, may be applied to any opening formed in the body or in the roof of the vehicle and the respective panel or panels may be combined with window panes, forming a part of the same windows, so as to allow, in case of emergency, the complete separation or removal of a part or of all of said windows.

It will, of course be apparent, that the connecting system in accordance with this invention may be adapted to serve as a means for closing doors, windows or any other kind of openings in buildings or other fixed constructions.

The invention also has in view other objects which will more fully appear in the course of the following description of the same.

In order that the invention may be clearly understood and readily carried into practice, a preferred embodiment of the same has been shown by way of example in the accompanying illustrative drawings, in which—

Figure 4 illustrates the application of the invention in combination with the ordinary windows of an omnibus, tramway or other vehicle for the conveyance of passengers.

Figure 5 is a cross section and elevation of the foregoing figure, in which the arrangement of said windows in their closed position may be seen, and Figure 6 is another cross section and elevation showing the manner of performing complete removal of said windows.

The same reference characters have been used to indicate like or corresponding parts in the several figures.

Figure 1:
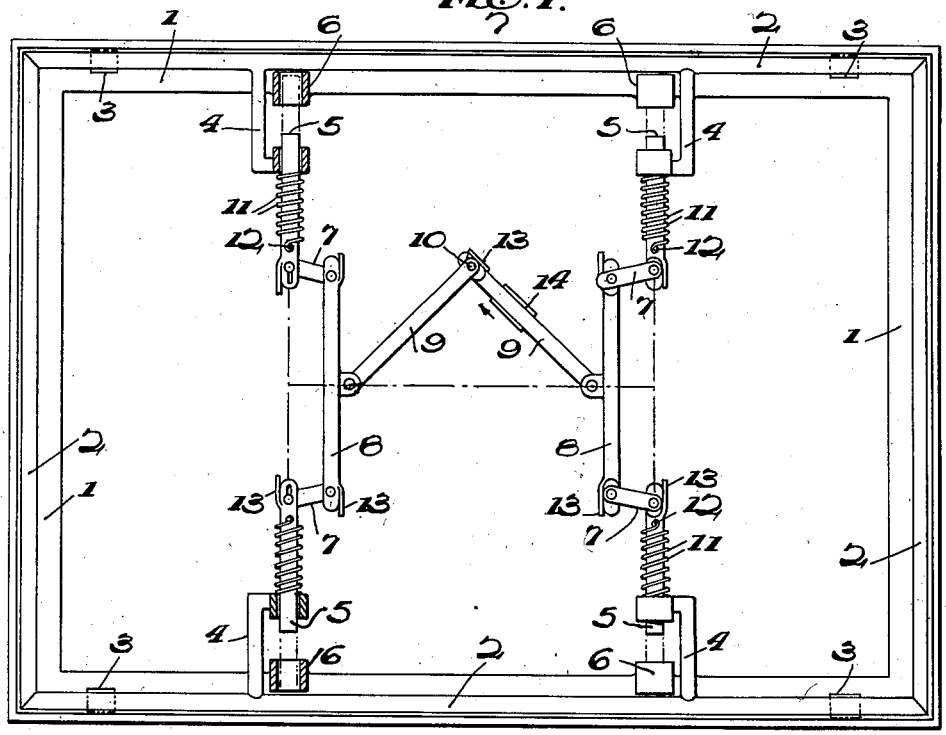
Figure 1 is a front elevation showing the relation of the several elements which constitute the improved connecting device in accordance with this invention.
Figure 2:
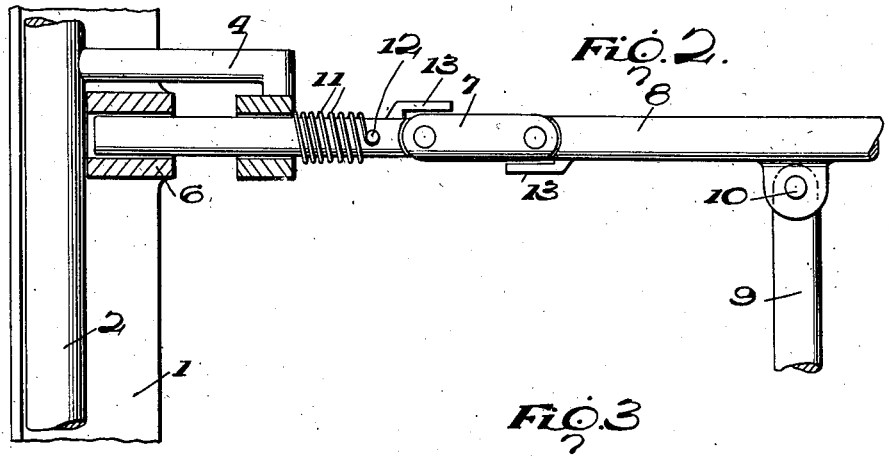
Figure 2 is a partial detail of the conjoint, in its position of closure.
Figure 3:
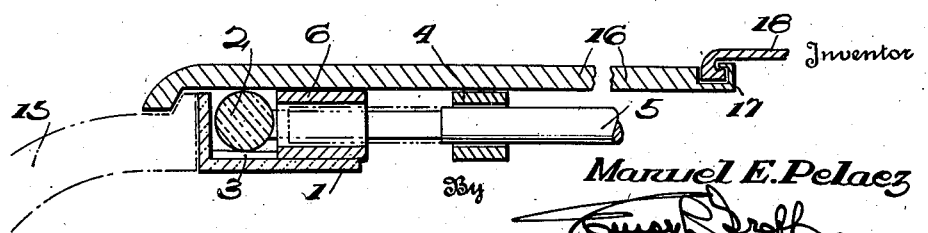
Figure 3 is an elevation, partially sectional, which illustrates the application of the assembly to an opening formed in the roof of a motor car or other collective vehicle.

In the form of construction shown in Figures 1 to 3, a fixed main frame 1, preferably of rectangular shape, is used for being permanently affixed by any suitable or convenient means to the corresponding opening.

The said main frame 1 is preferably constructed of L-shaped iron or of other suitable profile in cross section, to enable the same to accommodate in its interior an internal secondary removable locking frame 2, preferably of cylindrical cross section, conveniently supported on the shims or dowels 3 arranged on the horizontal wing of the frame 1, said removable frame 2 being intended to be carried by a cover or panel 16.

When referring to the drawings it will further be seen that the removable frame is provided with fixed brackets 4, of conveniently bent shape, within each of which is slidably mounted a bolt formed by a rod 5, adapted to be received, after the manner of a shutter bolt, in the interior of tubular socket or keeper members 6, formed integral with the frame 1, so as to maintain said elements 1 and 2 assembled one with the other.

Each pair of rods 5, arranged on the same axis, are linked by means of connecting rods 7 to the opposite ends of two actuating bars 8, of which the central points are pivoted, in turn, to two levers 9, also pivotally connected together by means of a stud 10 or the like.

Under normal conditions, the bolts 5 are maintained in retracted position by heavy springs 11 or the like, suitably interposed between the ends of the brackets 4 and pins 12 secured to said bolts. When referring to said figures it will also be seen that at the jointed ends of the bolts 5, bars 8 and levers 9, small stops or retention lugs 13 are provided, for the purpose of limiting the turning movement of said elements, until each of the same are placed in rectilinear alinement in relation to its adjacent members. On the other hand, on one of the toggle levers 9, a small tubular member 14 is slidably arranged, the purpose of which will be explained later on.

The main frame 1 is intended, for instance, to be placed in a suitable opening formed in the roof 15 of a vehicle for transporting passengers. As shown in Figure 3, this may be a tight friction fit, or conventional fastenings may be used to anchor the frame to the roof structure.

As will be further seen from Figure 3, a removable cover 16 of any appropriate type, and conveniently shaped to prevent the entrance of rain or dust into the vehicle, and carrying the locking frame 2, is placed over the fixed main frame 1 with the bolts or latches 5 in operative relation to the sockets 6.

In order to connect the frame 2 carried by the cover 16 with the main frame 1, the connecting rods 7 are swung in an outward direction by the movement of the toggle links 9—9 into alinement thereby causing the bars 8 to aline with the bolts or latches 5—5 as indicated by the dot and dash lines in Figure 1 and shown in detail in Figure 2. When the bolts 5 are projected outwardly by the connecting rods 7, they overcome the tension of the springs 11 and the outer ends of said bolts, will be caused to advance and enter into the tubular members 6, whereby the parts 1 and 2 will be securely engaged one with another.

The rotation of the connecting rods 7 with regard to their adjacent elements, is limited by the stop lugs 13.

In this position, the levers 9 will also be arranged along a straight line, perpendicular to the connecting rods 7, as shown in dot and dash lines in Figure 1, in which position the tubular sleeve 14 is shifted until covering the common joint 10, whereby the entire cover assembly will be held secure, in its position of closure.

In case of accident, it will be sufficient to release the joint 10 between the levers 9, whereby these latter will, by the action of the springs 11, instantaneously be carried to the position shown in Figure 1. Under these conditions, the closure panel 16 which carries the frame 2 will be disconnected from the frame 1, leaving the opening of the same totally free, for allowing of the escape of the passengers.

If desired, and in order to be able to operate the mechanism from outside, there may be provided on the roof 16 a small additional opening 17, adapted to be closed by a small sliding door 18, through which access may be had to the slidable member 14 which when shifted away from the joint 10 automatically releases the locking mechanism.

The modified construction shown in Figures 4 to 6 consists in that the frame 1 is of plane configuration and is slightly chamfered at its upper part, allowing at the required moment, of totally disengaging the frame 2 towards one of its sides, as shown in detail in Figure 6.

In this case, the frames 2 replace the usual windows of a vehicle of any kind, for which purpose the respective window frames 19 are slidably mounted therein, being connected together in series on their outer side by the guard rods 20.

The frames 2 are provided at their lower and inner edges with lugs 21, for resting against the internal part of the body 22, so as to prevent the same from sliding outwards; at their upper and inner edges, said frames 2 are provided with tubular members 23, within which are mounted small rods 24 for sliding after the manner of shutter bolts, being conveniently connected together, in suitable groups or series, by means of bars 25, slidably mounted at the interior of the vehicle body, said bars 25 being connected, in turn, to an oscillatory connecting link 26, adapted to be swung by a controller bar 27, preferably mounted at a central part of the vehicle.

In Figures 4 and 5, all the panels or windows are shown in their position of closure.

In case of accident, it will be sufficient to pull the controller bar 27 in a downward direction, as indicated by the arrow in Figure 4, thereby causing the rotation of the connecting link 26 about its centre so that it will drag the bars 25 in converging directions, whereupon the rods 24, integral with the same, will release the tubular members 23 of the frames 2 and thus cause the disengagement and consequent fall of the these said frames in an outward direction, as shown in detail in Figure 6, and leaving entirely free the openings previously occupied by said frames.

The arrangement above described and shown in the accompanying drawings may be adapted, in either of its forms, to any kind of openings of doors, windows, or to fixed constructions of any kind.

From the foregoing description, the nature and operation of this invention will have fully been understood and no further explanations will be required by those skilled in the art.

It will be evident that several modifications of construction and detail may be introduced, without departing from the basic principle and scope of this invention, to be clearly set forth in the claims annexed to this specification.

I claim:

1. An emergency escape panel for passenger vehicles and the like, comprising a main frame adapted to be fitted in an opening in a wall or roof of the vehicle, means on the main frame forming two transversely opposite sets of inwardly facing keeper sockets, a closure panel for cooperating with said main frame, a secondary frame carried by the inner face of the panel and fitting within the main frame, transverse pairs of bolts carried by the secondary frame for engaging and disengaging said keeper sockets, springs for automatically urging said bolts away from said sockets, and means for moving the bolts and holding them in latching relation to said keeper sockets to secure the closure panel to the main frame, said means comprising a pair of parallel actuator bars, connecting rods pivotally connecting the ends of said bars with the ends of said bolts, and medially jointed toggle levers pivotally connected at their outer ends with said bars.

2. An emergency escape panel for passenger vehicles and the like, comprising a main frame adapted to be fitted in an opening in a wall or roof of the vehicle, means on the main frame forming two transversely opposite sets of inwardly facing keeper sockets, a closure panel for cooperating with said main frame, a secondary frame carried by the inner face of the panel and fitting within the main frame, transverse pairs of bolts carried by the secondary frame for engaging and disengaging said keeper sockets, springs for automatically urging said bolts away from said sockets, and means for moving the bolts and holding them in latching relation to said keeper sockets to secure the closure panel to the main frame, said means comprising a pair of parallel actuator bars, connecting rods pivotally connecting the ends of said bars with the ends of said bolts, and means for manually and positively moving said bars and rods into rectilinear alinement with the bolts when the bars and rods move the bolts to latching position, said means when initially subjected to manual pressure medially thereof tending to be collapsed by the force of the springs acting on the bolts, and in turn on the rods and bars to effect automatic unlocking of the secondary frame and closure panel from the main frame.

3. An emergency escape panel for passenger vehicles and the like, comprising, a main frame adapted to be fitted in an opening in a wall or roof of the vehicle, means on the main frame forming two transversely opposite sets of inwardly facing keeper sockets, a closure panel for cooperation with said main frame, a secondary frame carried by the inner face of the panel and fitting within the main frame, two sets of transversely opposite inwardly extending brackets on the secondary frame having guideways alined with the related keeper sockets, bolts slidable in said guideways, springs for urging said bolts to retracted relation with respect to said sockets, a pair of bolt-actuating bars disposed parallel to each other and also disposed in planes parallel to but inwardly offset from the axial planes of opposite bolts, connecting rods pivotally joining the ends of said bars to the inner ends of adjacent bolts, means on said rods cooperating with said bolts and bars for limiting the angular movement of the bars, and a pair of medially jointed toggle levers pivoted at their outer ends to said bars, said levers when rectilinearly alined moving said bars outwardly to turn the said rods and push the bolts into locking relation to said sockets, thereby to lock the secondary frame and panel to the main frame and also move the bars and rods into rectilinear axial alinement with said bolts, and said levers, when initially manually urged to broken angular relation, being forced by said springs to full broken position to turn the inner ends of the connecting rods away from the bolts to enable the springs to move them out of the sockets and free the secondary frame and closure panel from the main frame.

MANUEL EDUARDO PELAEZ.